United States Patent [19]
Eglit

[11] Patent Number: 5,850,207
[45] Date of Patent: Dec. 15, 1998

[54] METHOD AND APPARATUS FOR MINIMIZING EFFECTS OF SLOPE OVERLOAD CONDITION WHEN USING DIFFERENTIAL PULSE CODE MODULATION SCHEME

[75] Inventor: Alexander Julian Eglit, Half Moon Bay, Calif.

[73] Assignee: Cirrus Logic, Inc., Fremont, Calif.

[21] Appl. No.: 561,726

[22] Filed: Nov. 22, 1995

[51] Int. Cl.$^6$ .................................................. G09G 5/00
[52] U.S. Cl. .......................................... 345/132; 345/138
[58] Field of Search ................................... 345/127, 131, 345/132, 138, 202; 382/232, 233, 238, 298, 299, 300; 358/451, 528; 348/458

[56] References Cited

U.S. PATENT DOCUMENTS

| | | | |
|---|---|---|---|
| 3,927,372 | 12/1975 | Zschunke | 325/38 B |
| 5,151,791 | 9/1992 | Moriyama et al. | 358/261.2 |
| 5,257,103 | 10/1993 | Vogeley et al. | 358/140 |
| 5,285,197 | 2/1994 | Schmidt et al. | 345/213 |
| 5,298,899 | 3/1994 | Oh et al. | 341/132 |
| 5,323,188 | 6/1994 | Kawayachi et al. | 348/412 |
| 5,325,182 | 6/1994 | Murata et al. | 348/663 |
| 5,367,383 | 11/1994 | Godshalk et al. | 358/455 |
| 5,408,542 | 4/1995 | Callahan | 382/56 |
| 5,418,714 | 5/1995 | Sarver | 364/413.13 |
| 5,444,493 | 8/1995 | Boie | 348/448 |
| 5,446,498 | 8/1995 | Boon | 348/448 |
| 5,497,434 | 3/1996 | Wilson | 345/202 |
| 5,621,429 | 4/1997 | Yamaashi et al. | 345/202 |

FOREIGN PATENT DOCUMENTS

| | | | |
|---|---|---|---|
| 0 367 418 A2 | 5/1990 | European Pat. Off. | G06F 15/62 |
| 1 457 556 | 12/1976 | United Kingdom | H04N 7/12 |

*Primary Examiner*—Jeffery Brier
*Attorney, Agent, or Firm*—Robert Platt Bell; Steven A. Shaw

[57] ABSTRACT

A display controller to upscale a source video image for display on a display unit of a computer system. An encoder circuit stores in a local memory pixel data of previous scan lines required for interpolation in a compressed format using differential pulse code modulation (DPCM) scheme. As a part of the DPCM scheme, encoder generates a predicted value for each source video pixel data as a function of at least one prior pixel data value in the scan line. However, when a slope over load condition is encountered, the decoder circuit changes the predicted value for a subsequent pixel data value to a different value, which may enable the graphics controller circuit to avoid a slope overload condition as to subsequent pixel data values. A decoder circuit decompresses the pixel data into original format prior to sending to an interpolator. The interpolator receives a present scan line and the decompressed data of previous scan lines, and interpolates the received pixels to generate additional pixels required for upscaling the source video image. When a slope overload condition is encountered, a override circuitry causes the interpolator to use for interpolation a pixel data value in the present scan line instead of the pixel data value causing the slope overload condition.

34 Claims, 9 Drawing Sheets

Figure 1

METHOD AND APPARATUS FOR MINIMIZING EFFECTS OF SLOPE OVERLOAD CONDITION WHEN USING DIFFERENTIAL PULSE CODE MODULATION SCHEME

CROSS REFERENCE TO RELATED APPLICATIONS

The subject matter in this application is related to that in co-pending U.S. patent application 08/536,315 entitled "A METHOD AND APPARATUS FOR UPSCALING VIDEO IMAGES IN A GRAPHICS CONTROLLER CIRCUIT" filed September 30th, and that in co-pending U.S. patent application 08/536,577 entitled "A METHOD AND APPARATUS FOR OVERCOMING A SLOPE OVERLOAD CONDITION WHILE USING DIFFERENTIAL PULSE CODE MODULATION SCHEME" filed Sep. 30, 1995, both of which are incorporated herein by reference.

FIELD OF THE INVENTION

The present invention relates generally to computer graphics systems and more specifically to a method and apparatus for upscaling video images using a graphics controller circuit.

BACKGROUND OF THE INVENTION

A need frequently arises to upscale video images while displaying these video images on computer systems. For example, a CD-ROM decoder in a computer system may generate a source video image of size 160×120 pixels and the image may be displayed on a display area of size 640×480 pixels on a display screen of the computer system. In such a situation where size of a display image is larger than size of a source image, the source video image may be upscaled to the larger display image while still maintaining the characteristics of the source video image.

Interpolation is a well-known prior art technique used for upscaling video images. In an interpolation scheme, several adjacent pixels in a source video image are typically used to generate additional new pixels. FIG. 1 shows pixels (A–I) of a source video image and pixels (Rxx) that are additionally generated by interpolation to upscale the source video image. Pixel R12 may be generated, for example, by formula (4/5A+1/5B).

If each pixel is represented in RGB format, RGB components of pixel R12 may be generated by using corresponding components of pixels A, B. Pixel 51 may similarly be generated using the formula (1/5A+4/5C). Generation of pixels such as R12–R15 may be termed horizontal interpolation as pixels R12–R15 are generated using pixels A, B located horizontally. Generation of pixels such as R21–R51 may be termed vertical interpolation.

Graphic controller circuits in prior art computer systems may use a display memory to store data representing source image pixels prior to upscaling source video images. Such graphics controller circuits may store pixel data in a scan line dominant order, i.e., pixel data corresponding to a given scan line may be stored in consecutive locations in display memory prior to storing pixel data of a subsequent scan line. Such a scan line dominant order of storing may cause pixel data of different scan lines to be stored in different pages of display memory.

During vertical interpolation of source image data, throughput performance problems may be encountered in a scan line dominant order storing scheme as vertical interpolation may require pixels from different scan lines. Accessing different scan lines may require retrieving data from different pages of display memory, thereby forcing a non-aligned or non-page mode read access. A non-page mode read access may require more clock cycles than a page mode access for memory locations within a pre-charged row. Thus the average memory access time during vertical interpolation may be much higher than consecutive memory accesses within a same row. High average memory access time during vertical interpolation may result in a decrease in overall throughput performance of a graphics controller circuit.

To minimize number of accesses across different rows, a graphics controller circuit may retrieve and store pixel data of a source video image scan line in a local memory element. For example, with respect to FIG. 1, a graphics controller circuit may retrieve and store all pixel data corresponding to row 1 and store retrieved pixel data in a local memory located in the graphics controller circuit. The graphics controller circuit may then retrieve pixel data corresponding to row 6, and interpolate using pixel data stored in the local memory to generate additional pixel data for scan lines 2–5.

While describing generating additional pixel data for scan lines 2–5, row 1 (i.e., scan line data stored in local memory) may be referred to as a previous scan line, and pixel data of row 6 (i.e., scan line data being retrieved display memory during interpolation clock cycles) may be referred to as a present scan line. Scan line data of row 6 may in turn be referred to as previous scan line while generating additional pixel data for rows 7-b in FIG. 1.

One problem with above scheme employing local memory is that a large local memory may be required. For example, to store 720 pixels of a scan line with each pixel being represented in RGB format, and with each of RGB components stored as eight bits, a memory of size 720×3×8=17280 bits may be required. Such a large local memory may increase cost of graphics controller circuits and require additional silicon space.

To minimize size of such local memory, a graphics controller circuit may store source video image pixel data in a compressed format in local memory. The graphics controller circuit may decompress source video pixel data stored in a compressed format, and use decompressed pixel data for interpolation to generate additional pixels. As the graphics controller stores the source video image pixel data in compressed format, the amount of storage space required in local memory may be reduced.

A graphics controller circuit may compress source video pixel data using a scheme such as differential pulse code modulation (DPCM) to take advantage of high correlation between adjacent pixels in a video image. In a DPCM scheme, a graphics controller may generate compressed data for each pixel data of a source video image scan line as a function of one or more prior pixel data in the scan line. For example, with reference to FIG. 1, to generate compressed data for a source video image pixel G, a graphics controller circuit may generate a predicted value based on two prior source video image pixel data values A and B, subtract pixel data value G from the predicted value, and quantize the result of subtraction to generate compressed pixel data for pixel G.

FIG. 8 comprises two graphs illustrating an example of differential pulse code modulation. X1-axis of the first graph represents a clock cycle during which a graphics controller may process a pixel data, the value of which is represented on Y1-axis. The second graph represents a quantization function with Y1-axis representing a difference computed from a predicted value of a pixel data value, and X1-axis representing a quantized value onto which the difference may be mapped. The quantized value may represent compressed pixel data value for the pixel.

Assuming values of 115 and 110 (shown with reference to Y1-axis) for source video image pixel data A and B (of FIG. 1) received at times T801 and T802 respectively, a graphics controller may generate 120 (shown along axis Y1) for predicted value (P) for next pixel G by extrapolating 115 and 110. If G has a pixel data value of 129, graphics controller circuit may generate 9 by subtracting predicted value from pixel data value of G. Graphics controller circuit may generate a quantized value J equal, in this example, to 9 (using quantization function represented by second graph) using one of several well-known techniques to generate a value to fit in a desired number of bits of the compressed data.

The second graph in FIG. 8 with axis Y2 and X2 illustrates the operation of a linear quantizer. It will however be appreciated that it is within the scope and spirit of the present invention to use either a linear quantizer or a non-linear quantizers. Only positive side of the quantizer is shown for purposes of clarity, and the quantizer may comprise a negative side also as is well-known in the art. The quantizer may operate with predicted value P as a reference point for quantizing pixel G. Pixel G is shown with reference to both axis Y2 (with value 9 which represents difference from predicted value) and Y1 (with value 129 which represents pixel data value).

Such a quantizer may map difference value 9 (shown on Y2-axis) to value Q on the X2-axis according to a quantization function represented by graph with axis X2–Y2 to generate a quantized value for source video image pixel data G. Quantized values are generally represented in lesser number of bits than pixel data values, thereby achieving desired compression. A quantized value may be stored as compressed pixel data.

Quantizers may map all difference values above a certain value to a maximum number that may be represented by number of bits in quantization output. With reference to the graph in FIG. 8, all values above A1 may be mapped to a maximum quantized value B1. A range defined by 0 and A1 may be termed the aperture of quantizer. Quantizers may have an aperture on a negative side also as is well known in the art. All values below negative aperture may be mapped to a minimum quantized value B2 (not shown).

As will be appreciated from above explanation, a graphics controller circuit may generate a predicted value as a function of prior pixels for each pixel data, and use the predicted value as a reference point for a quantizer. A graphics controller circuit may quantize the difference of reference point and pixel data value to generate compressed data value for a pixel data. A graphics controller may generate a predicted value for each pixel and generate compressed pixel data for each source video pixel data in a similar manner.

One problem that may arise while generating such compressed pixel data is that a graphics controller circuit may not be able to accurately predict a predicted value for a pixel data, and the difference of the pixel data and the predicted value may exceed the quantization aperture (either in a positive direction or a negative direction). Such a condition wherein the difference value exceeds the quantization aperture is referred to as a slope overload condition.

A graphics controller circuit may be unable to accurately reproduce source video pixel data from the compressed pixel data when a slope overload condition is present as illustrated in FIG. 7. In FIG. 7, at clock cycle T0, pixel data of a source video signal is shown with a value of 76. At clock cycles T1–T4, pixels of a scan line are shown with pixel data values of 135, 136, 138 and 137 respectively.

Assuming a four bit quantization output and a linear quantizer function, a quantizer may have an aperture of only 16. Thus the quantizer may represent a maximum increase of only 16 during each period while the difference value exceeds the aperture during clock cycles T1–T4.

Pixel data reproduced from compressed pixel data may accordingly vary from source video pixel data when a slope overload condition is present as further shown in FIG. 7. The reproduced pixel data may have a value of 92 during clock cycle T1–T2, 108 during T2–T3, and 124 during T3–T4. Eventually at clock cycle T4, the pixel data reproduced may equal source video pixel data, i.e., 139.

Hence, for a few clock cycles, pixel data may not be accurately reproduced when a slope overload condition is present. Situation, such as in FIG. 9, wherein positive aperture of quantizer is not sufficient to represent a difference value, may be termed positive slope overload condition. On the other hand, when quantizer aperture is not sufficient to represent a negative difference value, a negative slope overload condition is said to be present.

Generating additional pixel data from such inaccurately reproduced pixel data may result in an upscaled video image that may itself differ from source video image in characteristics other than size due to the variance of reproduced pixel data from source video pixel data. Such difference in upscaled video image may not be acceptable.

SUMMARY OF THE INVENTION

The present invention comprises a graphics controller circuit for interpolating a set of source video pixel data of a source video image to generate an additional set of pixel data of an upscaled video image. The graphics controller circuit may comprise an interpolator for receiving at least two pixel data comprising a pixel data of a present scan line of the source video image and a corresponding pixel data of a previous scan line of the source video image. The interpolator normally interpolates the two pixel data to generate said additional pixel data.

Upon a first condition, an override circuit in the graphics controller circuit causes the interpolator to generate the additional pixel data from an adjacent pixel data located adjacent to the pixel data of the previous scan line. The adjacent pixel data may be a pixel data in the present scan line.

The graphics controller circuit of the present invention may further comprise a line buffer for storing pixel data of the previous scan line in a compressed format. The line buffer may decompress the data in the compressed format, and provide the decompressed pixel data of the previous scan line to the interpolator. The first condition upon which the override circuit operates may be, for example, a slope overload condition while compressing the source video image pixel data.

The override circuit of the present invention may comprise a multiplexor coupled to receive the adjacent pixel data and said pixel data of said previous scan line, and selectively forward the adjacent pixel data to the interpolator upon the slope overload condition.

The line buffer may further comprise an encoder for compressing pixel data of the previous scan line to generate a set of compressed pixel data. The compressed pixel data may be stored in a local memory. A decoder may decompress the set of compressed pixel data and provide pixel data of the previous scan line to the multiplexor. The decoder may detect the slope overload condition, and cause the multiplexor to forward the adjacent pixel data to the interpolator.

The encoder may comprise a first predictor for generating a first predicted value for a next pixel data normally from a first recoverer value, and a first adder for receiving each source pixel data and a corresponding first predicted value. The first adder may generate a difference value of the source pixel data and the corresponding first predicted value. The encoder may also include a quantizer for quantizing the difference value to generate a compressed pixel data for the corresponding source pixel data.

A first recoverer in the encoder may receive each of the compressed pixel data, and generate the first recoverer value from the compressed pixel data. The first recoverer may determine whether a slope overload condition is encountered when said quantizer quantizes the difference value, and force the first predicted value for said next pixel data to a different value if said slope overload condition is encountered. Such forcing may enable the quantizer to avoid a slope overload condition when generating compressed pixel data for the next pixel data.

In a first embodiment of the line buffer, the quantizer may generate a predetermined value for said compressed pixel data when a slope overload condition is encountered. The first recoverer may determine whether said slope overload condition is encountered by examining said compressed pixel data. In an alternate embodiment of the line buffer, the first recoverer may determine whether a slope overload condition is encountered based on consecutively received maximum quantization values.

The decoder of the present invention may comprise a second predictor for generating a second predictor value normally from a second recoverer value. A second recoverer may receive the compressed pixel data from the local memory, and generate the second recoverer value for each compressed pixel data. The second recoverer may determine whether a slope overload condition is present, and force the second predictor to generate a different second predictor value for a next pixel data if the slope overload condition is present. The decoder may also comprise a second adder for receiving the second predicted value and the second recoverer value, and generate the pixel data of the previous scan line from the second predicted value.

BRIEF DESCRIPTION OF THE DRAWINGS

FIG. 1 is a diagram illustrating pixels in a source video image and the additional pixels in a corresponding upscaled image.

DESCRIPTION OF THE PREFERRED EMBODIMENTS

Figure 2:
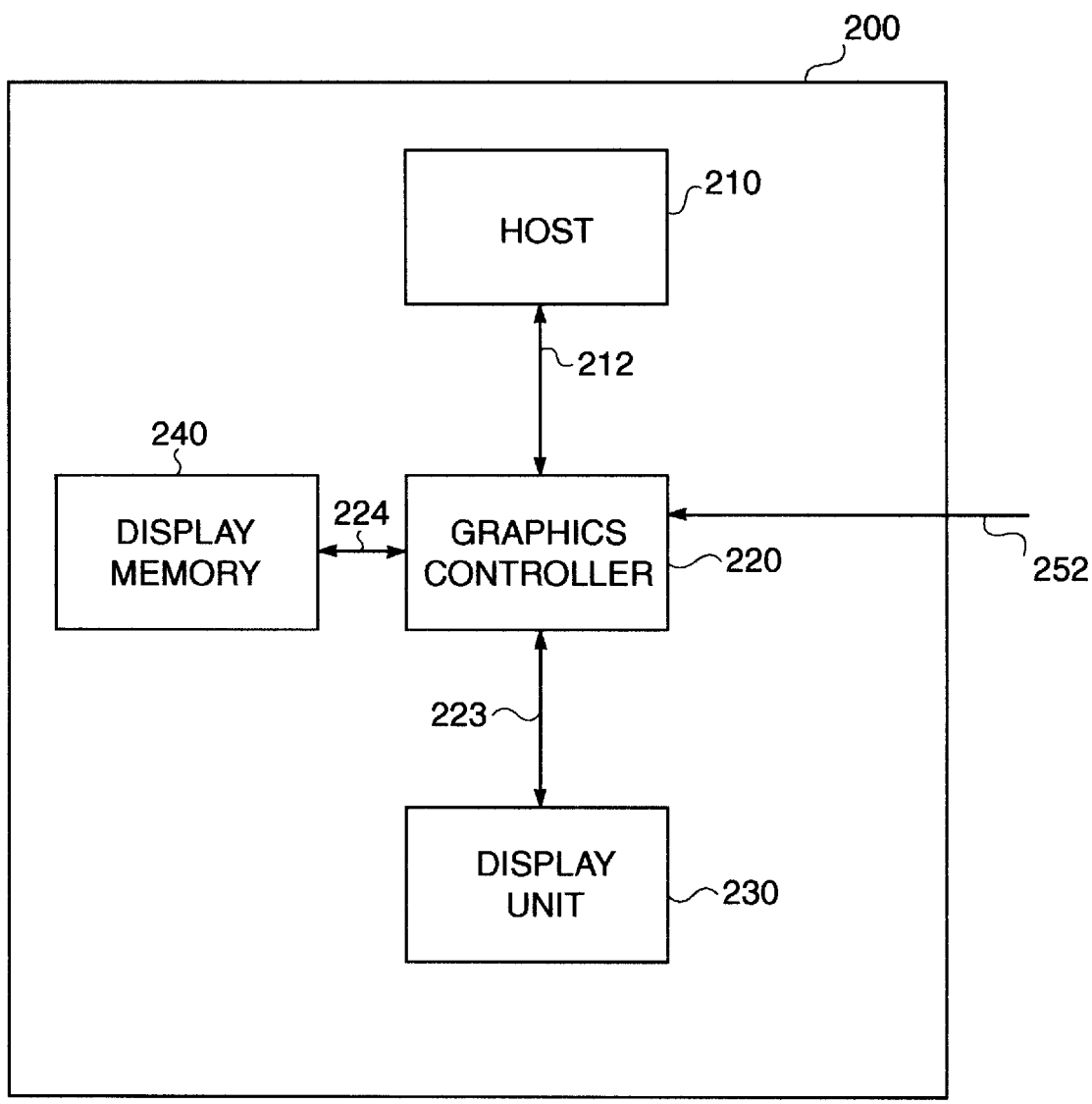
FIG. 2 is a block diagram of a computer system of the present invention comprising a host, a display memory, a graphics controller circuit and a display unit.

FIG. 2 is a block diagram of a computer system 200 of the present invention comprising host 210, graphics controller 220, display memory 240 and display unit 230. Display memory 240 may be integrated with graphics controller 220 as one unit.

Graphics controller 220 may receive pixel data of a source video image from an external device such as a video decoder (not shown) over video path 252 or from host 210, and store the received pixel data in display memory 240. The source video may be, for example, a television signal encoded in RGB 888 format.

Graphics controller 220 may then retrieve pixel data of each scan line of the source video image from display memory 240, compress the scan line data using differential pulse code modulation (DPCM), and store the compressed data in a local memory. As a part of the DPCM scheme, graphics controller 220 may generate compressed data for each source video pixel data of a scan line as a function of prior pixels in the scan line. Graphics controller 220 may decompress the compressed data, and use such decompressed pixel data for interpolation.

However, when a slope overload condition is detected while compressing a source video pixel data, graphics controller 220 of the present invention forces predicted value for a subsequent pixel to a different value. Such a different value may be closer to subsequent pixel data which may enable graphics controller 220 to avoid slope overload condition while compressing subsequent pixels. As a result, the reproduced values for subsequent pixel data may accurately represent corresponding source video pixel data.

Figure 1:
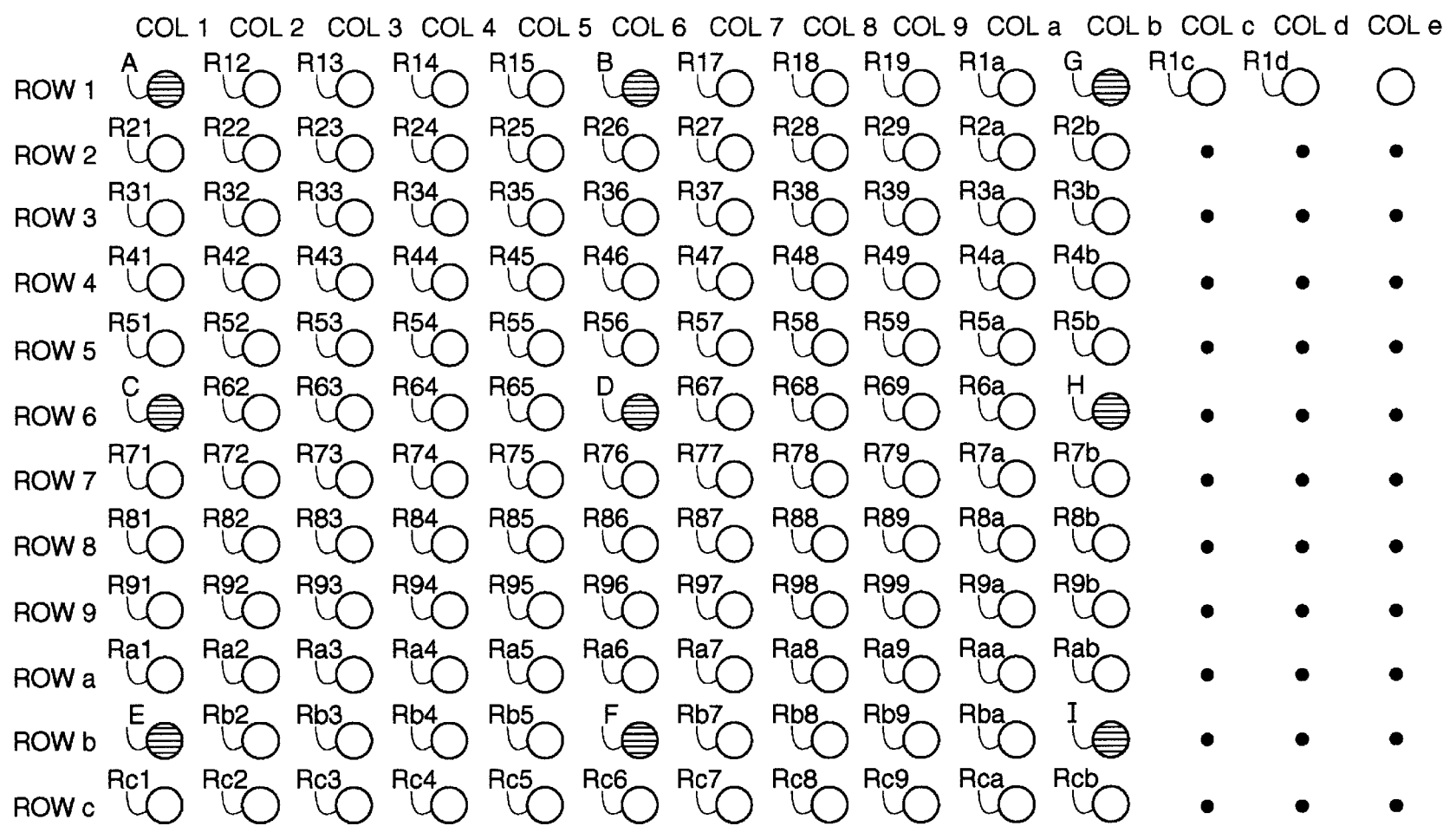

In addition, if a slope overload condition is encountered while compressing a source video pixel data of a previous scan line, graphics controller 220 of the present invention may use for interpolation a corresponding source video pixel data in a present scan line in stead of the decompressed pixel data of the source video pixel data of the previous scan line. For example, with reference to FIG. 1, if a slope over load condition is encountered while compressing source video pixel data G, graphics controller 220 may use source video pixel data value H in stead of reproduced data value for G while interpolating. In effect, source video pixel data H may be replicated to generate additional pixel data values R2b, R3b, R4b and R5b as graphics controller 220 of the present embodiment may use only two pixel data for vertical interpolation.

It will be appreciated that source video pixel data H may be closer in value to source video pixel data G than the reproduced pixel data value of G due to the slope overload condition encountered while compressing pixel data G and because of the high correlation generally present between adjacent pixels in video images. Hence, display quality may be better (i.e., in less variance with source video image) by using source pixel data H than using reproduced pixel data of G. It will be further appreciated that due to high correlation between adjacent pixels in video images, difference in display quality resulting from using source pixel data H instead of G (even without slope overload condition) may not be discernible by human eye.

Continuing with reference to FIG. 2 again, host 210 may send graphics/text/video data over system bus 212 to graphics controller 220. System bus 212 may comprise, for example, a PCI bus. Graphics data may be received in a RGB 565 format. It will however be appreciated that the graphics data may be in any other format or with different number of bits of representation without departing from scope and spirit of the present invention.

Graphics controller 220 may receive graphics/text/video data over system bus 212 and store in display memory 240 the graphics/text/video data along with any video data received over video path 252. Video data may comprise a television signal or any video image encoded in RGB format or YUV format or any other format for encoding video image. For example, the video data can be pixel data corresponding to a full motion video architecture (TM) (MVA) image. Graphics controller 220 may then display the display data comprising all of video data, text data and graphics data over path 223 on display Unit 230.

Figure 3:
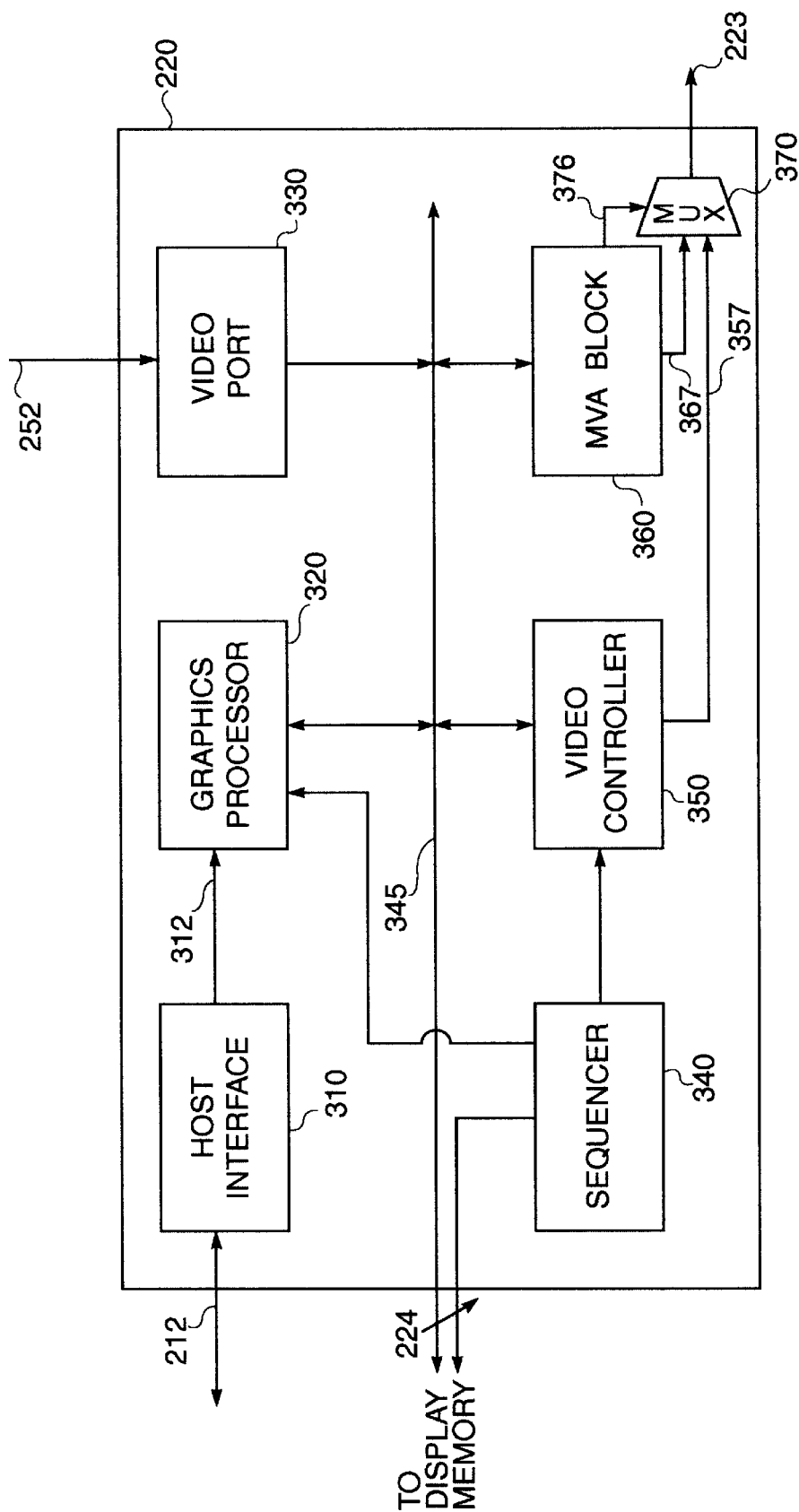
FIG. 3 is a block diagram of the graphics controller of the present invention including a MVA block which upscales the source video image.

FIG. 3 is a block diagram of graphics controller 220 of the present invention comprising host interface 310, graphics processor 320, video port 330, MVA block 360, video controller 350, and sequencer 340. MVA block 360 may receive video data over bus 345, and upscale the video data by manipulating the source video data received. MVA Block 360 may interpolate pixel data in the source video data to achieve such upscaling/downsizing.

MVA block 360 may store a source video pixel data of a previous scan line in a compressed format using differential pulse code modulation (DPCM). Such storing in compressed format minimizes the amount of local memory required for storing source video pixel data. MVA block 360 decompresses the compressed data, and interpolates the decompressed pixel data and source pixel data of a present scan line to generate additional pixel data for an upscaled video image. MVA block 370 may send upscaled video image pixel data to multiplexor 370 over a second mux input line 367.

MVA block 360 of the present invention may further include override circuitry to minimize effects of slope overload condition while compressing source video pixel data. MVA block 360 normally calculates a predicted value for a pixel based on at least one prior pixel data within the same scan line. However, if a slope overload condition is encountered while compressing a source video pixel (hereinafter referred to as slope over load pixel), MVA block 360 may force a predicted value for a subsequent pixel to a different value. Such a different value may be closer in value to a subsequent pixel data value, and a slope overload condition may be avoided at least as to that subsequent pixel data.

MVA block 360 of the present invention may use an adjacent pixel in stead of slope overload pixel of previous scan line while interpolating pixel data in present scan line and previous scan line. By using such an adjacent pixel, MVA block 360 may minimize the potential distortion in upscaled video image resulting from slope overload condition. The adjacent pixel may comprise, for example, a pixel data value in a present scan line.

Host interface 310 interfaces with system bus 212 to receive graphics/text data and instructions from host 210. Host interface 310 may be designed to interface with specific bus architecture implemented in system bus 212. For example, if system bus 212 comprises a PCI bus, host interface 310 may be designed to interface with a PCI standard bus.

Graphics processor 320 may receive graphics/video/text data and instructions from host interface 310 over path 312. Graphics processor 320 may execute instructions such as rotate, bit blocking on the received graphics data according to the instructions received and may generate additional graphics data as a result. Graphics processor 320 may store graphics data (either as received from host interface 310 or generated by executing instructions) in display memory 240 over local bus 345.

Video port 330 receives video pixel data over video path 252, and writes the received video pixel data into display memory 240 over local bus 345. Video pixel data received may be in a different format different from graphics data. For example, the video data can be in YUV format while graphics data may be in an RGB format.

Graphics data may be represented using a different number of bits to represent a pixel in relation to the video data. For example, graphics data may be represented using eight bits per pixel while video data may be represented using twenty-four bits per pixel. Representing video data using a higher number of bits allows for better resolution of video data.

It will be further appreciated that although video port 330 of present embodiment writes video data into display memory 240 before the video data is displayed, it is within the scope and spirit of the present invention to directly display video data on display unit 230 without being written into display memory 240.

Video controller 350 may receive graphics/text data from display memory 240 over local bus 224, and provide bits corresponding to RGB signals over a mux input line 357. Video controller 350 may then convert text data into corresponding pixels by, for example, using a font bit map stored in display memory 240. As a result of such conversion, video controller 350 sends to multiplexor 370 bits corresponding to RGB signals of graphics/text data received.

Multiplexor 370 accepts as input RGB bits corresponding to graphics/text data and video data on mux input lines 367 and 357 respectively, and selects as output one of the two inputs under the control of mux select signal 376 asserted by MVA Block 360. If display on display unit 230 at present screen refresh time corresponds to video data, mux select signal 376 is asserted so as to select video data on mux input line 367. On the other hand, if the display on the display unit 230 corresponds to graphics/text data sent by host 210, mux select signal 376 is asserted so as to select the graphics/text data on mux input line 357.

Sequencer 340 provides timing control to video controller 350, graphics processor 320, and display memory 240. The timing control may include various dot (pixel) clocks and horizontal count resolution.

Figure 4:
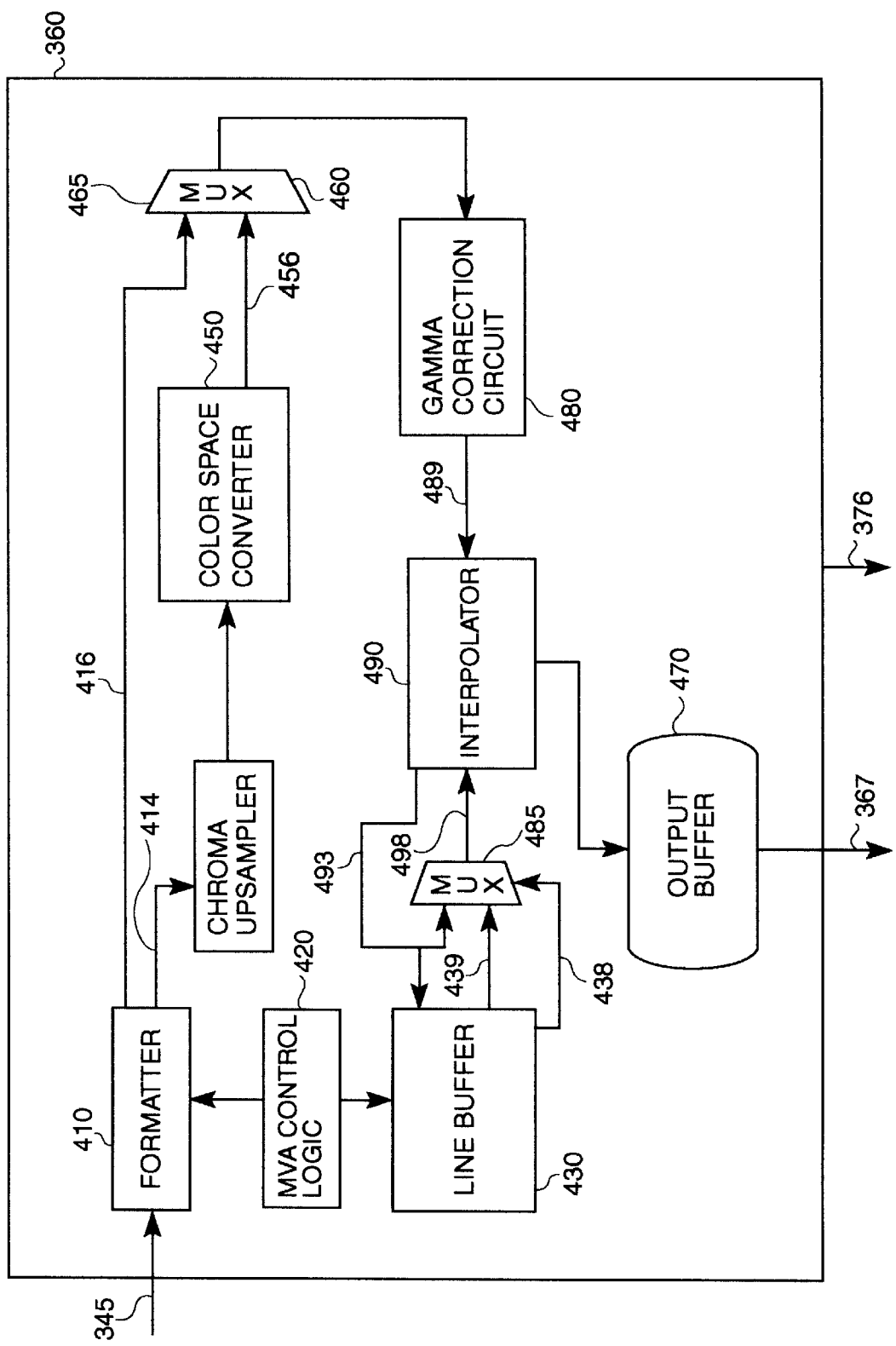
FIG. 4 is a block diagram of the MVA Block with an interpolator receiving pixels of previous scan lines from a line buffer storing the corresponding pixel data in a compressed format.

FIG. 4 is a block diagram of MVA Block 360 of the present invention. MVA Block 360 comprises formatter 410, chroma upscaler 440, color space converter 450, MVA control logic 420, line buffer 430, YUV-RGB select multiplexor 460, interpolator 490, override multiplexor 485, gamma correction circuit 480, and output buffer 470.

Line buffer 430 may receive pixel data of a scan line in an RGB 888 format over a line buffer input bus 493, store received pixel data in a compressed format, and then decompress the compressed data to provide interpolator 490 video pixel data in RGB 888 format over line buffer output bus 439. Interpolator 490 may use such video pixel data (of previous scan line) for interpolation in conjunction with a present scan line pixel data.

If line buffer 430 encounters a slope overload condition while processing (i.e., storing in compressed format and decompressing) a source video pixel data, line buffer 430 may generate a slope overload condition signal on slope over load condition signal line 438 while sending the corresponding decompressed pixel data.

Multiplexor 485 selects either a decompressed pixel data (received on line buffer output bus 439) or a pixel data of a present scan line (received on line buffer input bus 493) under the control of the slope overload condition signal. The slope over load condition signal has the effect of causing multiplexor 485 to output decompressed pixel data under normal conditions, and to output pixel data of the present scan line when a slope overload condition is encountered.

Interpolator 490 may receive source video pixel data from gamma correction circuit 480 and interpolate the received source video data. Interpolator 490 may perform horizontal interpolation corresponding to source video scan lines as the corresponding pixel data is received from gamma correction circuit 480. Since scan lines are scanned in a horizontal manner, horizontal upscaling may not require line buffering as in vertical interpolation.

To perform vertical interpolation, interpolator 490 may receive source video pixel data of a present scan line over bus 489, and forwards video pixel data to line buffer 430 over line buffer input bus 493. While forwarding a source video pixel data of a present scan line, interpolator 490 is designed to normally receive a corresponding vertical adjacent pixel of a previous scan line in decompressed format over line buffer output bus 498. For example, with reference to FIG. 1, while sending source video pixel data H of row 6, interpolator 490 receives decompressed pixel data of source video pixel data G of row 1.

Interpolator 490 of the present invention may generate additional pixel data by interpolating the source video pixel of the present scan line with pixel data received over line buffer output bus 498. As multiplexor 485 normally outputs pixel data of a previous scan line on output bus 498, interpolator 490 generates additional pixel data from previous scan line pixel data.

However, when a slope overload condition is encountered while processing a source video pixel data, as multiplexor 485 outputs pixel data of the present scan line, interpolator 490 may generate additional pixel data by interpolating the same pixel data. As an example, to generate additional pixel data R46 of FIG. 1, if slope overload condition is present while storing source video pixel data B, interpolator 490 of the present invention may use only pixel data D to generate pixel data R46. In such a case, interpolator 490 may merely replicate source video pixel data D to generate additional pixel data R46.

It will be appreciated that interpolator 490 may use one or more adjacent pixel data in stead of pixel data in present scan line in the presence of slope overload condition without departing from scope and spirit of the present invention. For example, when slope overload condition is encountered while storing source video pixel B, interpolator 490 may use pixels A, D and G for interpolation in stead of just pixel D.

As a horizontal scan line is generated, interpolator 490 may store the corresponding pixel data (including interpolated pixels) in output buffer 470. Such stored pixel data may then be available as input to multiplexor 370 on signal line 367. Horizontal scan lines may be generated as a result of both vertical and horizontal interpolation.

Formatter 410 may receive source video image pixel data from display memory 240 over bus 345. Received video data may be in any format such as RGB 555 format or RGB 888 or YUV 422. Formatter 410 converts RGB 555 or 565 data into 888 format, and sends converted data over a 24-bit bus 416. Formatter 410 therefore converts received pixel data into expected pixel format. If source video data is in YUV format, formatter 410 sends YUV signals over a bus 414.

Chroma upsampler 440 upsamples the chroma component of the YUV signal to compensate for potential down-sampling of the chroma signals while transmitting the source video signal to the computer system. Such down-sampling is typically done while scanning a television signal to take advantage of low spacial resolution for chroma compared to luminance in the human eye. Color space converter 450 converts the input YUV signal to RGB 888 format before sending such RGB 888 format data over 24-bit bus 456.

YUV-RGB select multiplexor 460 receives as input source video data in RGB 888 format on input lines 416 or 456 depending on whether source video data is in RGB or YUV formats respectively. YUV-RGB select multiplexor 460 selects one of the two inputs under control of input YUV-RGB select signal 465, which is typically driven from a bit in a register programmed by user. Gamma correction circuit 480 removes gamma from video signal and is conventional in the art.

Figure 5:
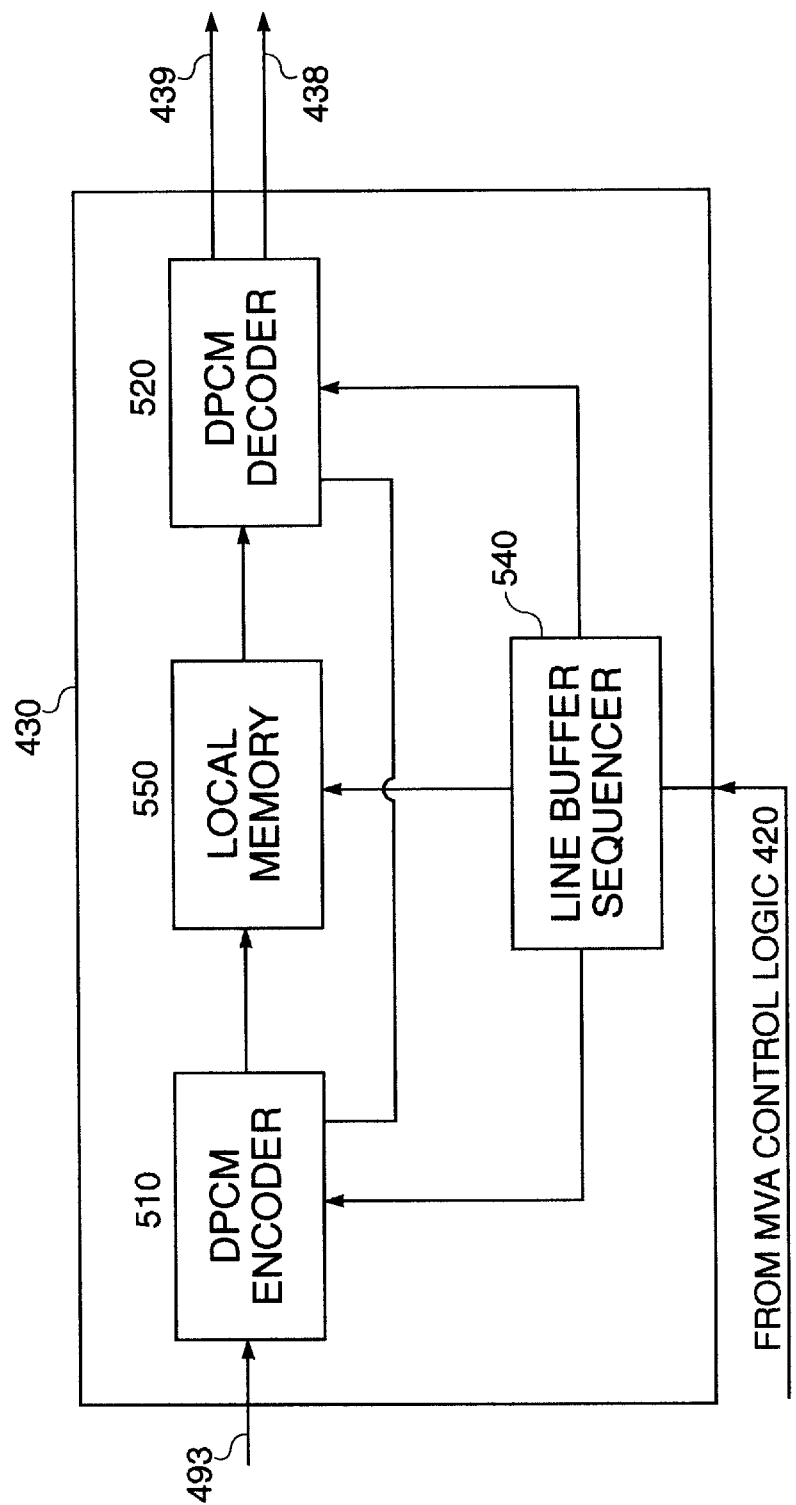
FIG. 5 is a block diagram of the line buffer comprising a DPCM encoder, a local memory and a DPCM decoder.

FIG. 5 illustrates a block diagram of line buffer 430 of the present invention. Line buffer 430 may comprise DPCM decoder 520, DPCM encoder 510, local memory 550, and line buffer sequencer 540 for each of the RGB components of source video pixel data. In the interest of conciseness, circuitry for only one of the three colors in shown and explained. However, buffer sequencer 540 may be shared by circuitry for all the three colors.

DPCM encoder 510 receives source video pixel data from interpolator 490, compresses the corresponding pixel data using DPCM, and stores compressed DPCM data in local memory 550. Since there is generally a high correlation between adjacent pixels in video signals (ex. television signals), source video pixel data lends to application of DPCM.

As a part of the DPCM scheme, DPCM encoder 510 generates a predicted value for each pixel data based on at least one prior pixel data value in the same scan line. However, if a slope overload condition is encountered while compressing a source video pixel data, DPCM encoder 510 may force predicted value for a subsequent source video pixel data to a different value. Such a changed predicted value may allow line buffer 430 to avoid slope overload condition as to subsequent pixels in the scan line.

DPCM encoder 510 may compresses the 24-bit RGB data into 12 bits in the preferred embodiment. It will however be apparent to one of ordinary skill in the art that Line buffer 430 may be designed using a different compression technique or a different number of bits without departing from scope and spirit of the present invention.

DPCM decoder 520 retrieves compressed DPCM data (i.e. 12 bits per pixel) from local memory 550, decompresses the DPCM data to provide interpolator 490 in the original RGB 888 format. Buffer sequencer 540 coordinates and controls the operations of DPCM encoder 510, and DPCM decoder 520.

DPCM decoder 520 of the present invention may also determine the presence of a slope overload condition, and change predicted value for subsequent source video pixel data similar to DPCM encoder 510. In addition, DPCM decoder 520 sends a slope overload condition signal over slope overload condition signal line 438 to cause multiplexor 485 to output source video pixel of present scan line received on line buffer input line 493. If slope overload condition is not present, DPCM decoder 520 causes multiplexor 485 to output decompressed pixel data received on line buffer output signal line 439.

Local memory 550 is designed to store at least 768 pixels to accommodate square pixel PAL format, which is believed to be the maximum number of pixels per scan line in the standard industry scanning formats. Local memory 550 may comprise an SRAM unit for faster access.

In the preferred embodiment of local memory 550, pixel data for only one scan line may be stored. Therefore, local memory 550 of the preferred embodiment comprises 768× 12 bits. However, a different number of bits may be required to store more scan lines or more pixels per scan line.

It will be appreciated that the amount of memory required may be reduced to half by compressing source pixel data into half using DPCM. However, additional circuitry to support compression (encoder) and decompression (decoder) is required to support such reduced memory. It will be further appreciated that although the present invention is explained with reference to DPCM, other compression schemes may be used without departing from the scope and spirit of the present invention.

Also, DPCM Encoder 510 and DPCM decoder 520 may be located in different systems. For example, DPCM decoder 520 may be located in a system such as a television set, and the DPCM encoder 510 may be located in a broadcast station.

Figure 6:
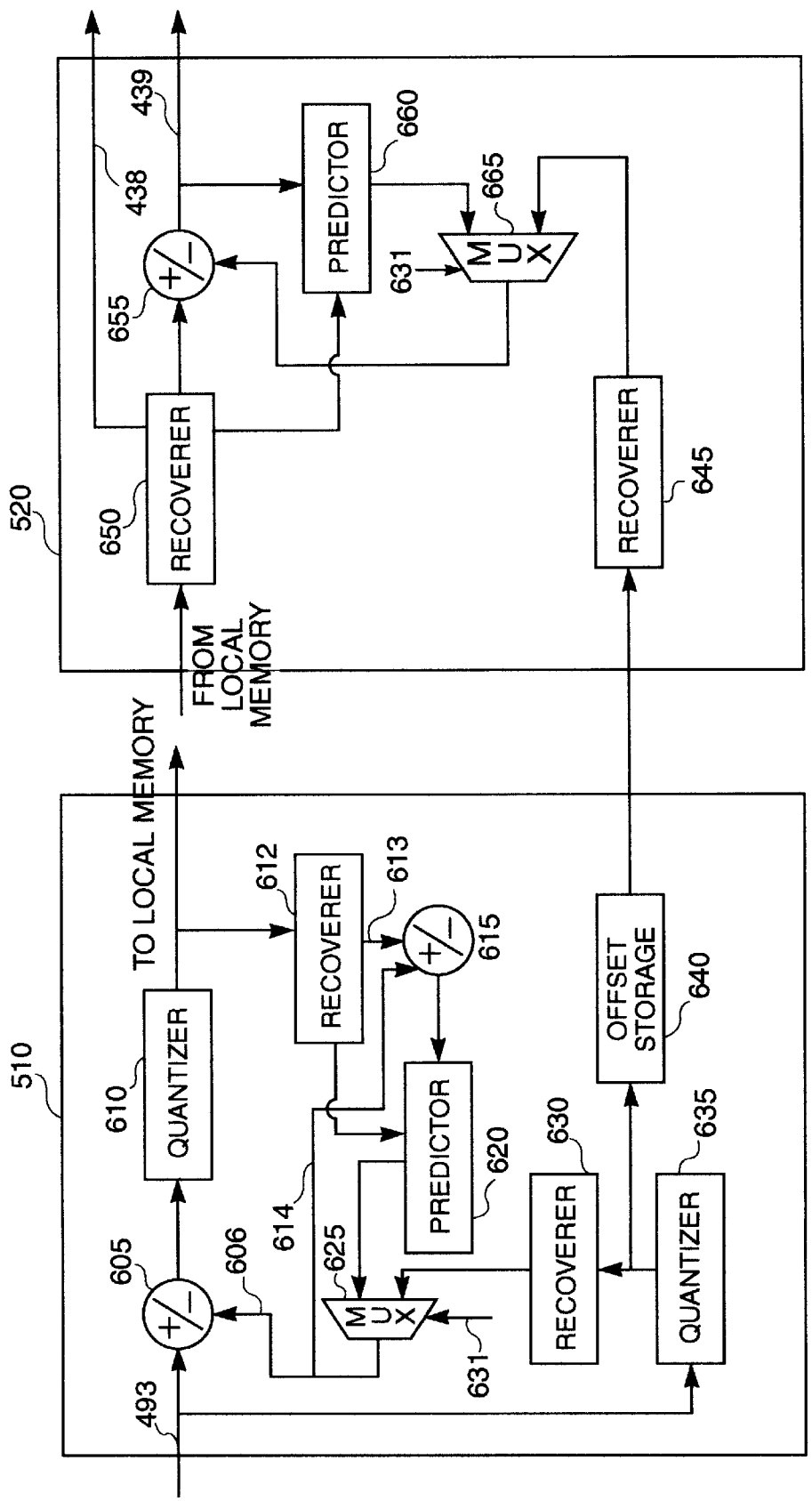
FIG. 6 is a detailed block diagram of DPCM encoder and DPCM decoder.

FIG. 6 is a more detailed block diagram illustrating operation of DPCM encoder 510 and DPCM decoder 520 in a preferred embodiment of the present invention. Adders 605 and 615, recoverer 612, and quantizer 610 in DPCM Encoder 510 together generate DPCM compressed data stored in local memory 550. Recoverer 650, adder 655, and predictor 660 together decode DPCM compressed data to generate decompressed pixel data in RGB format. The decompressed pixel data may be provided to interpolator 490 to generate additional pixel data for upscaled video image.

Adder 605 receives pixel data of source video (eight bits of one of the RGB components) on line 493 and a predicted value on line 606, and subtracts predicted value from the pixel data. Adder 605 may further comprise a clamp circuit to clamp the result of subtraction to within a predetermined range. Such range may be varied by means of a value stored in a register. In a preferred embodiment, two ranges {−128 to +127} and {−256 to +255} may be supported.

Quantizer 610 may receive output of adder 605 and quantize the received value into a lesser number of bits. Quantizer 610 of the present invention may generate a predetermined number for quantization output when a slope overload condition is encountered. The predetermined number may be one of the possible numbers represented by a number of bits in quantizer output. Quantizer 610 may store the lesser number of bits in local memory 550. In one embodiment, quantizer 610 output may comprise four bits.

Recoverer 612 accepts as input the quantized four bits and normally generates an output 613 of eight bits recovered value. However, if the quantized four bits correspond to the predetermined number (i.e., a slope overload condition is present), recoverer 612 bypasses adder 615 and forces predictor 620 to a new predicted value for a subsequent pixel.

In the preferred embodiment, recoverer 612 may initially force the predicted value to middle of range of numbers representing source video pixel data using the bus 612. For example, if each source video pixel data comprises eight bits having values 0–255, recoverer 612 may force the predicted value to 127. While processing the next pixel in the source video pixel data stream, if a slope overload condition is again encountered (i.e., predetermined value received for quantizer 610 output), recoverer may force predicted value to a number other than 127.

Such a scheme adjusting the predicted value may be of particular use in line buffer 430 which has a small quantizer aperture. When a small aperture is present, line buffer 430 may need to process several source video pixels before slope overload condition is overcome. Until then, the pixel data reproduced may not be accurate, and the display quality may accordingly not be acceptable.

Adder 615 receives the recoverer value from recoverer 612 and a predicted value over bus 614, and generate a difference of the two input values. Predictor 620 receives the output of adder 615 and normally predicts a predicted value for a subsequent pixel from the adder output.

However, when a slope overload condition is encountered, predictor 620 may be forced by recoverer 612 to generate a different prediction value. Predictor 620 sends prediction value for each subsequent pixel to adder 605 via multiplexor 625.

Recoverer 650 in DPCM decoder 520 of the present invention operates similar to recoverer 612. Recoverer 650 retrieves compressed pixel data (four bits per pixels) from local memory 550, and generates an eight bit recoverer value as output.

When a compressed pixel data equals the predetermined value, which signifies a slope overload condition, recoverer 650 of the present invention also forces predictor 660 to a different predicted value similar to recoverer 612. Without such forcing, predictor 660 may generate predicted value from output of adder 655.

Also, recoverer 650 sends a slope overload condition signal over slope overload condition signal line 438 to cause multiplexor 485 to output source video pixel of present scan line received on line buffer input line 493. If a slope overload condition is not present, DPCM decoder 520 causes multiplexor 485 to output decompressed pixel data sent on line buffer output signal bus 439.

Adder 655 adds the recoverer value received from recoverer 650 and a predicted value received from predictor 660 via multiplexor 665 to generate the pixel data value for interpolation by interpolator 490. Adder 655 sends the pixel data value generated over the line buffer output signal bus 439.

Predictor 660 may receive the output of adder 655 to generate a predicted value for a next (subsequent) pixel. However, when a compressed pixel data signifies a slope overload condition, predictor 660 may be forced to generate a different predicted value similar to predictor 620. Predictor 620 may comprise a set of flip-flops, each to store a bit of the output of the predicted value.

Figure 7:
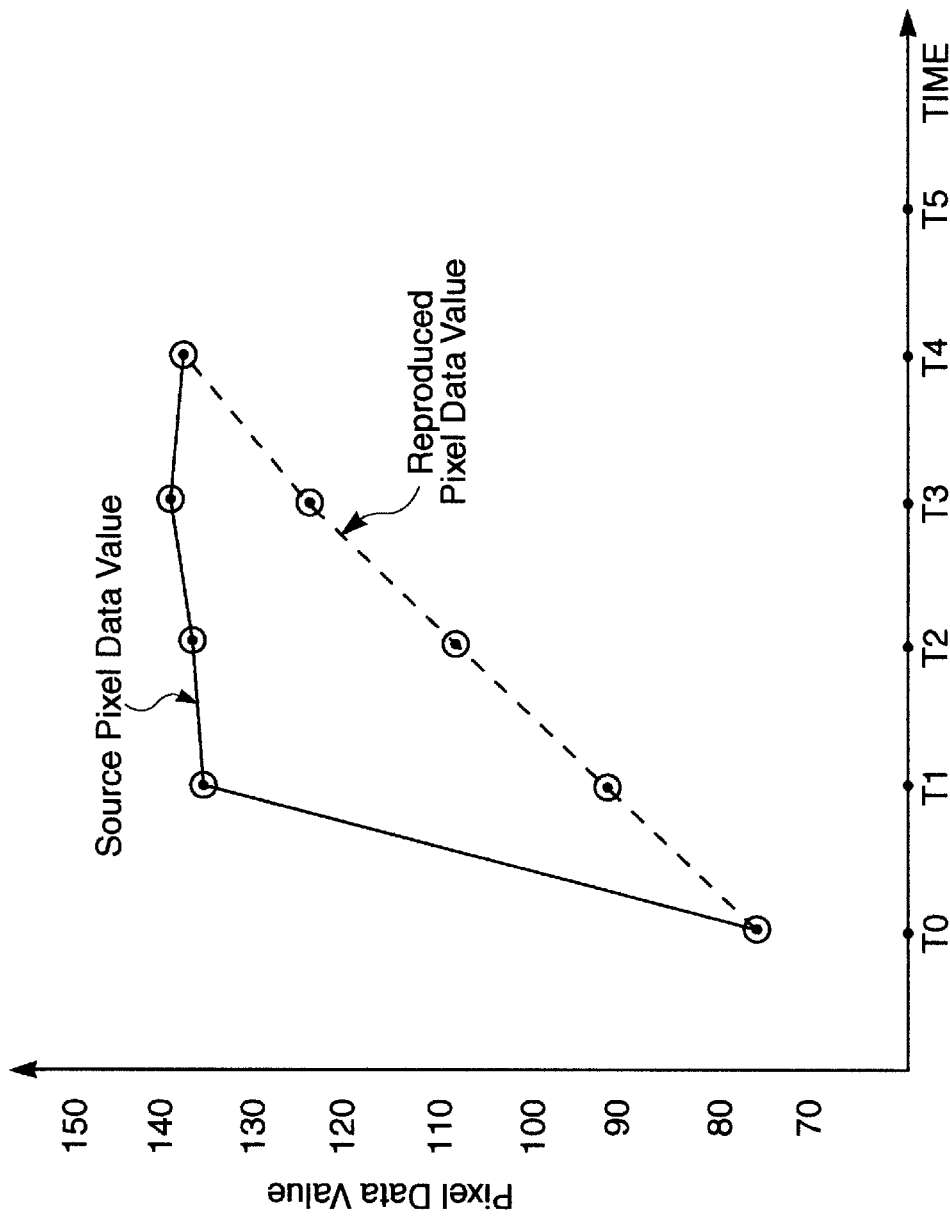
FIG. 7 is a graph illustrating slope overload condition in DPCM encoding.
Figure 8:
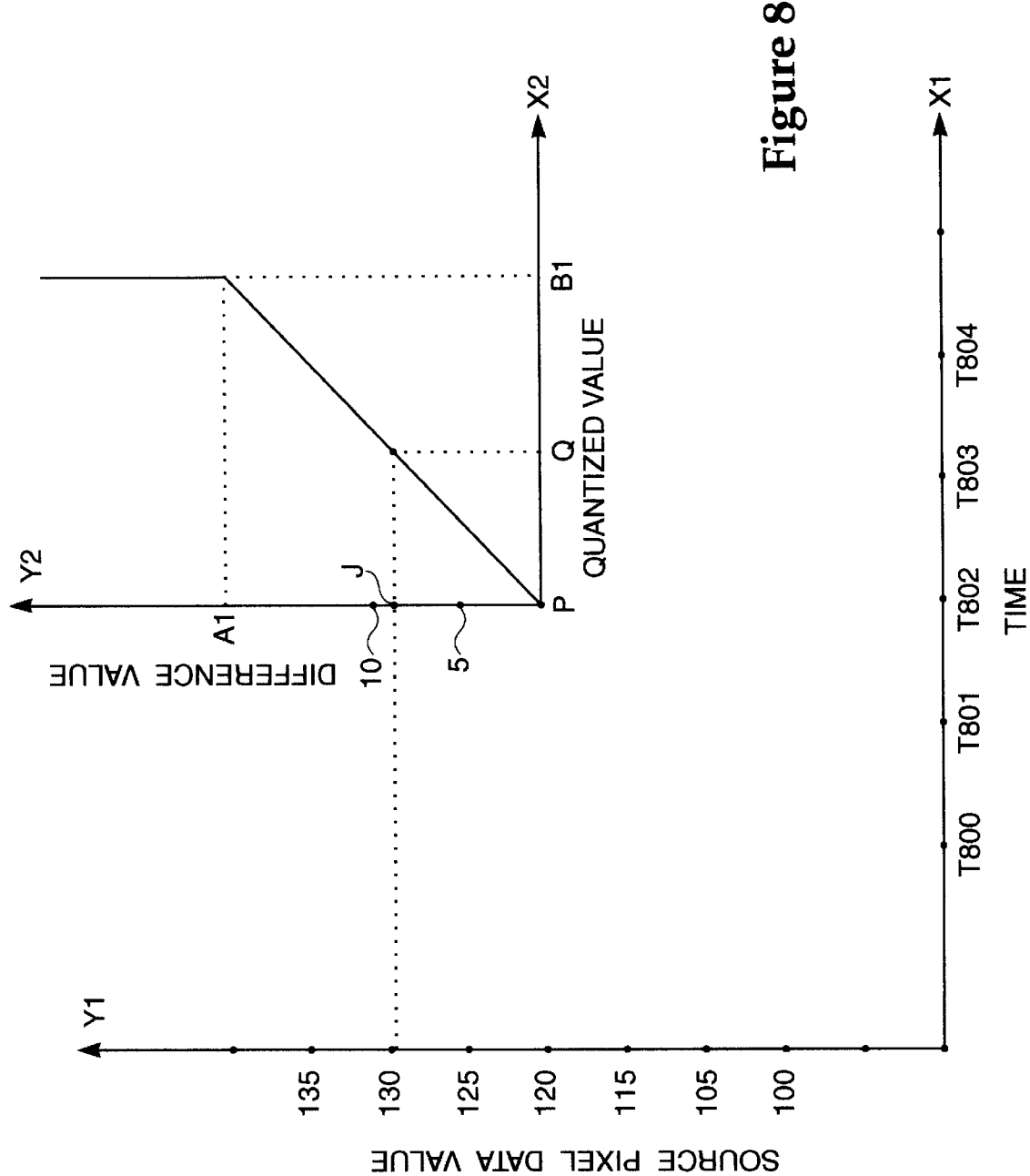
FIG. 8 illustrates an example of DPCM encoding.
Figure 9:
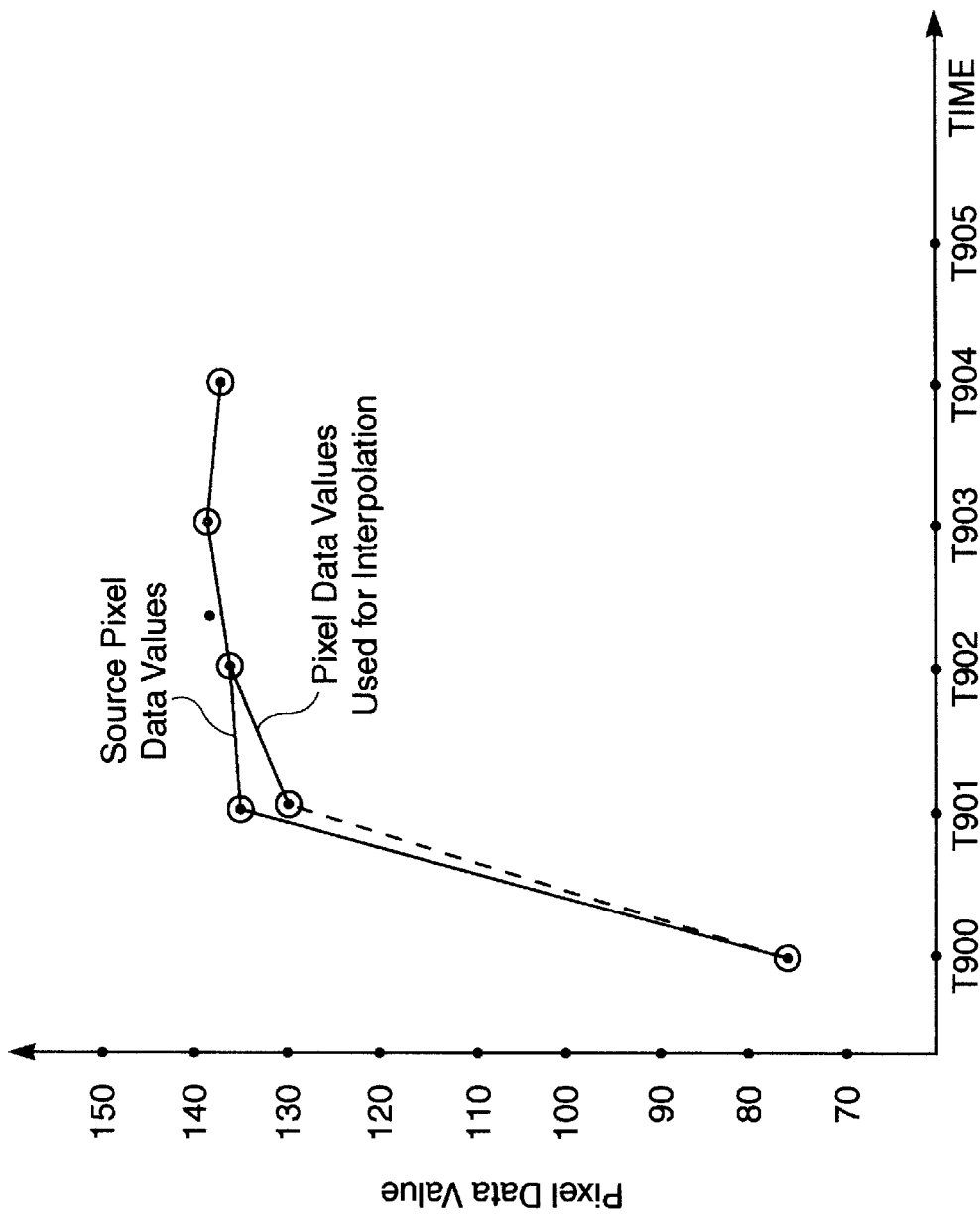
FIG. 9 is a graph illustrating operation of present invention in minimizing effects of slope overload condition.

FIG. 9 illustrates with an example the operation of line buffer 430 in minimizing effects of slope overload condition while processing pixel data of FIG. 7. Y-axis and X-axis of FIG. 9 represent pixel data values and time respectively. Source video pixel data and the corresponding pixel data provided to interpolator (i.e., output of multiplexor 485) are shown. As will be appreciated, a override circuitry comprising the multiplexor 485 provides a pixel data of the present scan line in stead of reproduced pixel data for interpolation when a slope overload condition is encountered while compressing the reproduced pixel data.

At clock cycles T900–T904 source video signal is received with pixel data values of 76, 135, 136, 138 and 137 respectively as in FIG. 7. While compressing pixel data value 135 of clock cycle T901, line buffer 430 may encounter a slope overload condition due to sudden increase in pixel data values (i.e., from 76 to 135) in one clock cycle. Assuming for the purpose of the present example a first order predictor 620, a linear quantizer 610, and a quantization aperture of 16, adder 605 may generate a difference value of 59, and the quantizer may generate a predetermined value, for example 10, to indicate a slope over load condition.

On receiving the predetermined value for the quantized value, recoverer 612 determines that a slope overload condition has occurred, and forces predicted value for next pixel of clock cycle T902 to the middle of the range of numbers representing source video pixel data, i.e., 127. Adder 605 subtracts predicted value 127 from next source video pixel data value of 136 to generate a difference of 9, which fits within the quantization aperture. Hence, slope overload condition is avoided for the pixel data value received during clock cycle T902.

In contrast, a conventional recoverer may generate a value close to 16 as pixels prior to clock cycle T900 may have pixel data values close to 76. As a result, slope overload condition may continue to be present during subsequent clock cycles also (for example T2 and T3 of FIG. 7). Hence during slope overload condition, because of the limitations in quantization aperture, an error may accumulate while encoder 510 processes successive pixel data values in source video signal.

However, as recoverer 650 and predictor 660 in encoder 510 operate similar to recoverer 612 and predictor 620 in decoder 520, the error may be replicated in decoder 520 also. Encoder 510 and decoder 520 may finally recover from error accumulation after processing few pixel data (for example, at clock cycle T4 in FIG. 7).

On the other hand, in the present invention, encoder 510 forces predicted value to a different value if a slope overload condition is encountered. By so forcing, subsequent pixel data values may be closer to corresponding predicted values, and a slope overload condition may be avoided at least with respect to the subsequent pixels.

In addition, recoverer 650 operates similar to recoverer 612, and forces predictor 660 to generate a prediction value of 127 upon receiving a compressed pixel data value equal to the predetermined value from local memory 530. Accordingly, when quantized value corresponding to clock cycle T902 is received, adder 655 computes the reproduced pixel value relative to predicted value of 127. Source video pixel data value corresponding to T902 is accordingly accurately reproduces, and slope overload condition is avoided from clock cycle T902 onwards.

Continuing with reference to FIG. 9, recoverer 650 of the present invention forces multiplexor 485 to replace reproduced pixel data corresponding to clock cycle T901 (i.e., when slope overload condition is encountered) with corresponding source pixel data of a present scan line. Assuming a pixel data value of 130 for such pixel in the present scan line, 130 is provided as input to interpolator 490 over bus 498. Accordingly, the pixel data used for interpolation may differ from the reproduced pixel data when a slope overload condition occurs. The reproduced pixel data is shown in FIG. 9.

In the above description, to indicate that a slope overload condition has occurred, a predetermined value is generated for the compressed pixel data value. In such a scheme, one of the quantization values is used to indicate slope overload condition, and accordingly quantizer 610 may have one less value for representing quantization outputs.

Hence, in an alternate embodiment of line buffer 430, quantizer 610 may generate a maximum quantized value (either in negative range or positive range) when a pixel data value is outside of the quantizer aperture. Recoverer 612 may examine the quantized values, and upon receiving a series of maximum quantized values, recoverer 612 may determine that a slope overload condition is present. In other words, if maximum quantized values are received during successive clock cycles, recoverer 612 may determine that a slope overload condition is present.

Recoverer 650 in decoder 520 may also similarly determine the presence of a slope overload condition. Recoverer 612 may force predictor 620 to generate a different value for prediction value of a next pixel similar to above embodiment earlier described.

It will be appreciated that several variations of recovers 650, 612 and predictors 620, 660 may be implemented without departing from the scope and spirit of the present invention. For example, the recoverer values may be incremented or decremented depending on recoverer values during previous clock cycles. Such a scheme may enable line buffer 430 to scale back predicted values if the predicted values have been over-incremented or over-decremented in prior clock cycles. For example, after forcing a predicted value to a higher value in response to a slope overload condition, if a negative slope overload condition is encountered, recoverers 650 and 612 may be designed to decrement subsequent predicted values.

Continuing with reference to FIG. 6, a override circuitry comprising multiplexors 625 and 665, recoverers 630 and 645, quantizer 635, and offset storage 640 may be designed to prevent a slope overload condition while processing a first pixel in a previous scan line. Override circuitry operates to generate a predicted value which is a function of first pixel data value while generating compressed data for the first pixel. As the predicted value is generated from the first pixel data itself, slope overload condition may be avoided while displaying pixel data around first pixel data.

Hence in the absence of such overriding circuit, a slope overload condition may be present while displaying a video signal. The slope overload condition leads to a display wherein the edges are blurred but gradually brightening as the display is observed towards the center. The override circuitry of FIG. 6 operates to prevent such blurring at the left hand edge of video display.

Referring to FIG. 6 again, quantizer 635 typically quantizes first pixel data to generate a four bit data value. In a preferred embodiment, quantizer 635 may comprise a non-linear quantizer well known in the art. If a linear quantizer is implemented, quantized value may comprise most significant four bits of the first pixel of a scan line. Recoverer 630 may generate a recoverer value comprising eight bits from the quantized value to generate a predicted value as a function of first pixel data. Hence, in effect, quantizer 635 and recoverer 630 operate to generate a predicted value as a function of first pixel data of a scan line.

Multiplexor 625 receives as inputs output of predictor 620 and output of recoverer 630, and selects one of the two inputs under control of first pixel select line 631. First pixel select line 631 causes multiplexor 625 to normally select as output the output predictor 620, but causes to select output of recoverer 630 when the pixel processed is a first pixel of the scan line. Therefore, DPCM decoder 520 of the present invention may include a communication path to receive the predicted value of the first pixel from DPCM encoder 510.

Therefore, when first pixel data of a scan line is processed, predicted value which is a function of first pixel data is passed on line 606 as input to adder 605. As the other input of adder 605 is the first pixel data itself, the result of subtraction may fit within aperture of quantizer 610. Hence, the input to quantizer 610 is within aperture of quantizer 610 and a slope overload condition is avoided.

Offset storage 640, recoverer 645, and multiplexor 665 operate to coordinate the override function in the DPCM decoder 520. Offset storage 640 stores the four bit quantized value generated by quantizer 635. Recoverer 645 generates eight bits from the quantized value stored in offset storage 640.

Multiplexor 665 operates to select as output an input from recoverer 645 while processing first pixel of a scan line, and input from predictor 660 while processing subsequent pixels within a scan line. Therefore, the override function is coordinated in both DPCM Encoder 510 and DPCM Decoder 520.

Hence, DPCM Encoder 510 generates a DPCM code of the source video pixel data and the DPCM Decoder 520 decodes the DPCM code to generate pixel data values for interpolator 490. DPCM Encoder 510 and DPCM Decoder 520 together further include a override circuitry to avoid a slope overload condition while processing a first pixel of a scan line. It will be further appreciated that the override circuitry may also be used in any slope overload situations including while processing pixels in other edges.

The operation of DPCM Encoder 510 and DPCM Decoder 520 is further illustrated with reference to an example. For the purpose of this example, linear quantizers are assumed. Assume that the first two pixels on a scan line are B4 and B9 respectively. Assume also that Predictor 620 has predicted a value of 0 for the first pixel.

To process first pixel data B4, Quantizer 635 generates four bits representing "B" which is stored in Offset Storage 640. Recoverer 630 generates a recoverer value of B0 by padding four zeroes into the least significant bit positions. Mux select signal line 631 is asserted to select B0 from Recoverer 630 instead of 00 from Predictor 620.

Adder 605 subtracts B0 received from Multiplexor 625 from the first pixel value B4 to generate 04, which is fed to Quantizer 610. Linear Quantizer 610 generates four bits representing 4, which is stored in local memory 550.

Recoverer 612 receives four bits representing 4, and generates eight bits representing 04. Adder 615 adds B0 (i.e. output of Multiplexor 625) and 04 (output of Recoverer 612) to generate B4. Since Predictor 620 of first order is assumed, Predictor 620 stores B4 as predicted value for the next pixel which is provided to Adder 605 through Multiplexor 625.

On the DPCM Decoder 520 side, Recoverer 650 receives four bits representing 4 from local memory 550, and generates eight bits representing 04. In parallel, Recoverer 645 retrieves four bits with value B from Offset Storage 640, and generates eight bits representing B0. Since B0 corresponds to the first pixel, Multiplexor 665 selects as output the B0 value stored in Recoverer 645.

Adder 655 adds B0 (output of Multiplexor 665) to 04 (value received from Recoverer 650) to generate B4—the pixel value sent to Interpolator 490. The value B4 is stored as predicted value in Predictor 660.

To process second pixel B9, Adder 605 subtracts predicted value B4 (generated while processing first pixel) from B9 to generate eight bits representing 05. Quantizer 610 quantizes the eight bits to (assuming a linear quantizer) four bits representing 5, which is stored in local memory 550.

Recoverer 650 of DPCM Decoder 520 receives four bits representing 5, and generates eight bits representing 05. Adder 655 adds the predicted value B4 to 05 to generate the pixel data value B9 sent to Interpolator 490.

Therefore, graphics controller 220 of the present invention decreases the number of successive accesses to different rows by retrieving the whole scan line and storing the corresponding pixels in a memory. Also, graphics controller 220 minimizes the size of local memory required to store scan lines for interpolation by having DPCM Encoder 510 store the pixels in a compressed format. In addition, graphics controller 220 provides a override circuitry to avoid a slope overload condition while compressing first pixel data.

Although the present invention has been illustrated and described in detail, it is clearly understood that the same is by way of illustration and example only and is not to be taken by way of limitation, the scope and spirit of the present invention being limited only by the terms of the appended claims.

What is claimed is:

1. A circuit for interpolating a set of source video pixel data of a source video image to generate an additional set of pixel data of an upscaled video image, said set of source video pixel data comprised in at least a previous scan line and a present scan line of said source video image, said circuit comprising:

an interpolator for receiving at least two pixel data comprising a pixel data of said present scan line and a corresponding pixel data of said previous scan line, said interpolator normally interpolating the two pixel data to generate said additional pixel data; and an override circuit for causing said interpolator to generate said additional pixel data from an adjacent pixel data located adjacent to said pixel data of said previous scan line upon a first condition.

2. The circuit of claim 1 wherein said adjacent pixel data comprises a pixel data in said present scan line.

3. The circuit of claim 1 further comprising a line buffer for storing pixel data of said previous scan line in a compressed format, and wherein said line buffer provides said pixel data of said previous scan line to said interpolator.

4. The circuit of claim 3 wherein said first condition comprises a slope overload condition while compressing said pixel data of said previous scan line.

5. The circuit of claim 4 wherein said override circuit comprises a multiplexor coupled to receive said adjacent pixel data and said pixel data of said previous scan line, said multiplexor selectively forwarding said adjacent pixel data to said interpolator upon said slope overload condition.

6. The circuit of claim 5 wherein said line buffer comprises:

an encoder for compressing pixel data of said previous scan line to generate a set of compressed pixel data;

a local memory for storing said set of compressed pixel data; and a decoder for decompressing said set of compressed pixel data and providing said pixel data of said previous scan line to said multiplexor, said decoder detecting said slope overload condition and causing said multiplexor to forward said adjacent pixel data to said interpolator.

7. The circuit of claim 6 wherein said encoder comprises:

a first predictor for generating a first predicted value for a next pixel data normally from a first recoverer value;

a first adder for receiving each source pixel data and a corresponding first predicted value, said first adder generating a difference value of the source pixel data and the corresponding first predicted value;

a quantizer for quantizing the difference value to generate a compressed pixel data for the corresponding source pixel data; and a first recoverer for receiving each of the compressed pixel data and generating said first recoverer value from the compressed pixel data, said first recoverer determining whether a slope overload condition is encountered when said quantizer quantizes the difference value, and forcing said first predicted value for said next pixel data to a different value if said slope overload condition is encountered, where forth said quantizer avoids a slope overload condition when generating compressed pixel data for said next pixel data.

8. The circuit of claim 7 wherein said quantizer generates a predetermined value for said compressed pixel data when a slope overload condition is encountered, and wherein said first recoverer determines whether said slope overload condition is encountered by examining said compressed pixel data.

9. The circuit of claim 7 wherein said first recoverer determines whether a slope overload condition is encountered based on consecutively received maximum quantization values.

10. The circuit of claim 7 wherein said decoder comprises:

a second predictor for generating a second predictor value normally from a second recoverer value;

a second recoverer for receiving said compressed pixel data from said local memory, and generating said second recoverer value for each compressed pixel data, said second recoverer determining whether a slope overload condition is present, and forcing said second predictor to generate a different second predictor value for a next pixel data if said slope overload condition is present; and a second adder for receiving said second predicted value and said second recoverer value, and generating said pixel data of said previous scan line from said second predicted value.

11. A graphics controller circuit for upscaling a source video image to an upscaled video image, comprising:

a line buffer for storing source video pixel data of a previous scan line in a compressed pixel format, said line buffer comprising:

a first predictor for generating a first predicted value for a next source video pixel data of said previous scan line normally from a first recoverer value;

a first adder for receiving each source video pixel data and a corresponding first predicted value, said first adder generating a difference value of the source video pixel data and the corresponding first predicted value;

a quantizer for quantizing the difference value to generate a compressed pixel data for the corresponding source pixel data;

a first recoverer for receiving each of the compressed pixel data and generating said first recoverer value from the compressed pixel data, said first recoverer determining whether a slope overload condition is encountered when said quantizer quantizes the difference value, and forcing said first predicted value for said next pixel data to a different value if said slope overload condition is encountered, wherefore said quantizer avoids a slope overload condition when generating compressed pixel data for said next pixel data;

a local memory for storing said set of compressed pixel data;

a second predictor for generating a second predictor value normally from a second recoverer value;

a second recoverer for receiving said compressed pixel data from said local memory, and generating said second recoverer value for each compressed pixel data, said second recoverer determining whether a slope overload condition is present, and forcing said second predictor to generate a different second predictor value for a next pixel data if said slope overload condition is present, said second recoverer also sending a slope overload condition signal on a slope overload condition signal line; and a second adder for receiving said second predicted value and said second recoverer value, and generating said pixel data of said previous scan line from said second predicted value;

a multiplexor for receiving said pixel data of said previous scan line from said second adder and a corresponding pixel data of a present scan line, said multiplexor normally sending on an output line said pixel data of said previous scan line, and said corresponding pixel data of said present scan line when a slope overload condition is encountered under the control of said slope overload condition signal line; and an interpolator coupled to said multiplexor for generating a set of additional pixel data of said upscaled video image by interpolating said pixel data sent by said multiplexor on said output line and corresponding pixel data of said present scan line.

12. A circuit for generating a set of compressed pixel data corresponding to a series of pixel data of a scan line, comprising:

a predictor for generating a predicted value for a next pixel data normally from a recoverer value;

an adder for receiving each pixel data and a corresponding predicted value, said adder generating a difference value of the pixel data and the corresponding predicted value;

a quantizer for quantizing the difference value to generate a compressed pixel data for the corresponding pixel data; and a recoverer for receiving each of the compressed pixel data and generating said recoverer value from the compressed pixel data, said recoverer determining whether a slope overload condition is encountered when said quantizer quantizes the difference value, and forcing said predicted value for said next pixel data to a different value if said slope overload condition is encountered, wherefore said quantizer avoids a slope overload condition when generating compressed pixel data for said next pixel data.

13. The circuit of claim 12 wherein said quantizer generates a predetermined value for said compressed pixel data when a slope overload condition is encountered, and wherein said recoverer determines whether said slope overload condition is encountered by examining said compressed pixel data.

14. The circuit of claim 12 wherein said recoverer determines whether a slope overload condition is encountered based on consecutively received maximum quantization values.

15. A circuit for decompressing a set of decompressed pixel data to generate pixel data of a scan line, comprising:

a predictor for generating a second predictor value normally from a recoverer value;

a recoverer for receiving said compressed pixel data, and generating said recoverer value for each compressed pixel data, said recoverer determining whether a slope overload condition is present in compressing said pixel data of said scan line, and forcing said predictor to generate a different predictor value for a next pixel data if said slope overload condition is present; and an adder for receiving said predicted value and said recoverer value, and generating said pixel data of said previous scan line from said second predicted value.

16. The circuit of claim 15 wherein said recoverer determines that said slope overload condition is present if a corresponding pixel data comprises a predetermined value.

17. The circuit of claim 15 wherein said recoverer determines that a slope overload condition is present if each of a sequence of compressed pixel data comprises a maximum quantization value.

18. A computer system for displaying a source video image comprising at least a present scan line and a previous scan line represented by a set of source video pixel data, said computer system comprising:

a graphics controller circuit for interpolating said set of source video pixel data of a source video image to generate an additional set of pixel data of an upscaled video image, said graphics controller circuit further comprising:

an interpolator for receiving at least two pixel data comprising a pixel data of said present scan line and a corresponding pixel data of said previous scan line, said interpolator normally interpolating the two pixel data to generate said additional pixel data; and an override circuit for causing said interpolator to generate said additional pixel data from an adjacent pixel data located adjacent to said pixel data of said previous scan line upon a first condition;

a display unit for displaying said upscaled video image.

19. The computer system of claim 18 wherein said adjacent pixel data comprises a pixel data in said present scan line.

20. The computer system of claim 18 further comprising a line buffer for storing pixel data of said previous scan line in a compressed format, and wherein said line buffer provides said pixel data of said previous scan line to said interpolator.

21. The computer system of claim 20 wherein said first condition comprises a slope overload condition while compressing said pixel data of said previous scan line.

22. The computer system of claim 21 wherein said override circuit comprises a multiplexor coupled to receive said adjacent pixel data and said pixel data of said previous scan line, said multiplexor selectively forwarding said adjacent pixel data to said interpolator upon said slope overload condition.

23. The computer system of claim 22 wherein said line buffer comprises:

an encoder for compressing pixel data of said previous scan line to generate a set of compressed pixel data;

a local memory for storing said set of compressed pixel data; and a decoder for decompressing said set of compressed pixel data and providing said pixel data of said previous scan line to said multiplexor, said decoder detecting said slope overload condition and causing said multiplexor to forward said adjacent pixel data to said interpolator.

24. The computer system of claim 23 wherein said encoder comprises:

a first predictor for generating a first predicted value for a next pixel data normally from a first recoverer value;

a first adder for receiving each source pixel data and a corresponding first predicted value, said first adder generating a difference value of the source pixel data and the corresponding first predicted value;

a quantizer for quantizing the difference value to generate a compressed pixel data for the corresponding source pixel data; and a first recoverer for receiving each of the compressed pixel data and generating said first recoverer value from the compressed pixel data, said first recoverer determining whether a slope overload condition is encountered when said quantizer quantizes the difference value, and forcing said first predicted value for said next pixel data to a different value if said slope overload condition is encountered, wherefore said quantizer avoids a slope overload condition when generating compressed pixel data for said next pixel data.

25. The computer system of claim 24 wherein said quantizer generates a predetermined value for said compressed pixel data when a slope overload condition is encountered, and wherein said first recoverer determines whether said slope overload condition is encountered by examining said compressed pixel data.

26. The computer system of claim 24 wherein said first recoverer determines whether a slope overload condition is encountered based on consecutively received maximum quantization values.

27. The computer system of claim 24 wherein said decoder comprises:

a second predictor for generating a second predictor value normally from a second recoverer value;

a second recoverer for receiving said compressed pixel data from said local memory, and generating said second recoverer value for each compressed pixel data, said second recoverer determining whether a slope overload condition is present, and forcing said second predictor to generate a different second predictor value for a next pixel data if said slope overload condition is present; and a second adder for receiving said second predicted value and said second recoverer value, and generating said pixel data of said previous scan line from said second predicted value.

28. A method of upscaling a source video image to generate an upscaled video image, wherein said source video image comprises at least a present scan line and a previous scan line represented by a set of source video pixel data, said method comprising the steps of:

receiving at least two pixel data comprising a pixel data of said present scan line and a corresponding pixel data of said previous scan line;

interpolating normally the two pixel data to generate a set of additional pixel data of said upscaled video image; and generating said set of additional pixel data from an adjacent pixel data located adjacent to said pixel data of said previous scan line and said pixel data of said present scan line upon a first condition.

29. The method of claim 28 wherein said adjacent pixel data comprises a pixel data in said present scan line.

30. The method of claim 28 further comprising the steps of:
  storing pixel data of said previous scan line in a compressed format in a local memory;
  decompressing pixel data in compressed format to generate decompressed pixel data; and
  providing said decompressed pixel data as pixel data of said previous scan line to said step of receiving.

31. The method of claim 30 wherein said first condition comprises a slope overload condition while compressing said pixel data of said previous scan line.

32. A method of generating a set of compressed pixel data corresponding to a series of pixel data of a scan line, said method comprising the steps of:
  generating a predicted value for a next pixel data normally from a recoverer value;
  subtracting each pixel data from a corresponding predicted value to generate a difference value of the pixel data and the corresponding predicted value;
  quantizing the difference value to generate a compressed pixel data for the corresponding pixel data; and
  generating said recoverer value from the compressed pixel data;
  determining whether a slope overload condition is encountered in said step of quantizing;
  forcing said predicted value for said next pixel data to a different value if said slope overload condition is encountered for a present pixel data,
  wherefore said quantizer avoids a slope overload condition when generating compressed pixel data for said next pixel data.

33. The method of claim 32 wherein said step of quantizing generates a predetermined value for said compressed pixel data when a slope overload condition is encountered, and wherein said step of determining determines whether said slope overload condition is encountered by examining said compressed pixel data.

34. The method of claim 32 wherein said step of determining determines whether a slope overload condition is encountered based on consecutively received maximum quantization values.

* * * * *